United States Patent

Rogakos et al.

[11] Patent Number: 4,850,466
[45] Date of Patent: Jul. 25, 1989

[54] CLUTCH FOR POWER DOOR LOCK ACTUATOR

[75] Inventors: Deno J. Rogakos, Centerville; Lynn M. Johnston, West Milton; Keith R. Cook, Beavercreek, all of Ohio

[73] Assignee: General Motors Corporation, Detroit, Mich.

[21] Appl. No.: 197,070

[22] Filed: May 19, 1988

[51] Int. Cl.[4] ............................................. F16D 13/14
[52] U.S. Cl. ........................................ 192/78; 192/76; 192/105 BA
[58] Field of Search ................. 192/76, 78, 105 BA, 192/105 BB

[56] References Cited

U.S. PATENT DOCUMENTS

| | | | |
|---|---|---|---|
| 2,036,586 | 4/1936 | LePorin | 192/105 BA |
| 3,145,817 | 8/1964 | Randall | 192/105 BA |
| 3,187,871 | 6/1965 | Rice | 192/105 BA |
| 3,204,737 | 9/1965 | Anner | 192/76 |
| 3,712,438 | 1/1973 | Roddy et al. | 192/76 X |
| 3,947,060 | 3/1976 | Zimmer et al. | 292/142 |
| 4,093,289 | 6/1978 | Inabayashi et al. | 292/336.3 |
| 4,119,188 | 10/1978 | Argereu | 192/105 BA |
| 4,311,331 | 1/1982 | Lutz | 192/105 CE |
| 4,573,723 | 3/1986 | Morita et al. | 292/336.3 |
| 4,610,343 | 9/1986 | Hikari | 192/105 BA |
| 4,645,050 | 2/1987 | Ingenhoven | 192/78 X |
| 4,674,781 | 6/1987 | Reece et al. | 292/336.3 |
| 4,706,512 | 11/1987 | McKernon et al. | 74/405 |

Primary Examiner—Leslie A. Braun
Assistant Examiner—Janice E. Chartoff
Attorney, Agent, or Firm—Patrick M. Griffin

[57] ABSTRACT

A power door lock actuator includes a one piece molded and centrifugally expandable brake ring that is held on a drive ring to a motor shaft within a lock lift arm driving cup that is freely pivoted to the shaft. A camming member on the drive ring fits within the brake ring so as to retain it to the shaft, to maintain it in a ready position spaced from the cup when stationary, and so as to jam it into the wall of the cup when turning.

1 Claim, 2 Drawing Sheets

CLUTCH FOR POWER DOOR LOCK ACTUATOR

BACKGROUND OF THE INVENTION

Early power door lock systems using an electric motor to power the lock lift arm up and down faced the problem of difficult manual operation. That is, if the lock lift arm was directly mechanically coupled to the motor, manual operation thereof would have to overcome the resistance of the motor. Several different clutches have been used, and many more proposed, for coupling the motor to the lock lift arm when the motor starts, but decoupling it when it stops.

Examples abound of various approaches to decoupling. An early clutch shown in U.S. Pat. No. 3,947,060 used a simple frictional slip device consisting of a rubber ring and hub which would turn one to one when turned slowly, by the motor, but which would slip when turned quickly by a manual override handle. U.S. Pat. No. 4,706,512 shows a rotary load sensitive releasable coupling consisting of a spring loaded wedged shaped tooth that cams past a stop at the end of travel of the power actuator so that later manual operation will not have to back drive the motor. U.S. Pat. No. 4,674,781 uses a lost motion coupling and a spring to drive a rack back to neutral position at the end of stroke so that manual operation will not see the resistance of the motor or the gearing. U.S. Pat. No. 4,573,723 uses a complex series of gears, wave washers and swing levers to reverse one of the gears when the motor stops and decouple the motor from the lock lift arm.

Despite the myriad possible approaches above, the more common approach is to use some type of centrifugal clutch interposed between the motor and whatever gear system is used to directly shift the lock lift arm up and down. Typically, a weighted member that is radially expandable outwardly under centrifugal force is located inside a cupped output member. The drive shaft is connected to the weighted member, and the cupped output member is somehow drivingly engaged to the lock lift arm. The weighted member is contracted and in its stationary state, but expands outwardly when spun to engage and drive the cup and the lift arm. When the motor is stopped, the weighted member contracts again, so that manual operation of the lock lift arm will not have to back drive the motor.

Many different designs for such a centrifugal clutch have been used and proposed. Most have some objectionable shortcomings in terms of complexity and consequent difficulties in assembly, operation, and cost. U.S. Pat. No. 4,311,331 shows a very complex centrifugal clutch with several weights, pivot pins and return springs. U.S. Pat. No. 4,610,343 discloses a clutch of nearly equal complexity, one which has the added feature of a series of elastic pillars located in the spaces between a central driver and a series of peripheral weighted shoes. The pillars are designed to wedge between the driver and the shoes when the shoes have made contact with the cupped output member, so as to increase the contact force therewith. Some systems go farther and also decouple the lock lift arm from the gear drive mechanism that runs the lock lift arm, to remove that resistance as well from manual operation. An example may be seen in U.S. Pat. No. 4,093,289. The centrifugal clutch disclosed there FIGS. 2 and 3 shows a series of weights on slides, but no means is disclosed, apparently, that would cause the weights to retract when stationary.

SUMMARY OF THE INVENTION

The improved clutch of the invention is used in a vehicle power door lock actuator that has a lock lift arm, a motor drive shaft, and a cupped output member that is freely pivoted coaxially to the drive shaft. The cup is geared to the lock lift arm so as to shift it up and down with a jack screw, and the drive shaft is run by an electric motor which is, in turn, controlled by a conventional circuit. The clutch of the invention selectively couples the drive shaft to the cup, and provides a particularly simple, effective, and easily assembled device, which also provides a very positive driving connection.

In the preferred embodiment, the clutch includes a brack ring molded of elastomer as a unitary piece with a pair of diametrically opposed, massive lobes joined by a pair of integral, generally U shaped spring members. The outer surfaces of the lobes are sufficiently tacky to make a frictional contact with the wall of the cup, while the inner surfaces of the lobes are generally parallel to one another, defining a rectangular relieved portion in the center. A drive ring joined coaxially to the motor drive shaft has a generally rectangular camming member at the center thereof which has a width approximately equal to the spacing of the inside surfaces of the brake ring lobes and a greater length. These two basic components of the clutch may be easily assembled by fitting the drive ring camming member into the brack ring and then sliding both parts inside the cup as a unit, and staking the drive ring to the drive shaft. The drive shaft does not directly engage the brake ring, which is held to the shaft by the drive ring.

At rest, the spring members keep the brake ring lobes drawn inwardly on the camming member. The close fit of the brake ring on the camming member maintains the brake ring basically coaxial within the cup, at a ready position with the outer lobe surfaces closely radially spaced from the inside wall of the cup. This orientation of the camming member between the lobes may be termed a non operative angular relation, that is, the orientation where the camming member width separates the lobes to hold them in the ready position, while its length is oriented ninety degrees the other way. With the motor off, then, manual movement of the lock lift arm will not see the load of the motor. When the motor starts, the drive shaft begins to spin the drive ring, which spins the brake ring, initially turning in one to one relation and remaining in the non operative relative angular relation. Very soon, however, the brake ring lobes begin to move radially out under centrifugal force, toward the cup wall. As soon as the lobes engage the cup wall, the brake ring begins to slow, relatively, and the camming member can begin to tilt or cock between the lobes. If the load seen by the cup increases, the camming member can tilt even farther, jamming between the lobes and pushing them out more strongly into the wall of the cup to increase the strength of the driving connection. The length of the camming member is sufficient that it will not turn or slip between the lobes, however. When the motor stops, the brake ring contracts under the force of the springs and returns to its ready position.

It is, therefore, a general object of the invention to provide an improved clutch for a power door lock actuator that has a particularly simple and effective design.

It is another object of the invention to provide such a clutch having a brake ring with a central relieved portion and a drive ring with a camming member that fits within the relieved portion and which cooperates with the brake ring to maintain the lobes of the brake ring at a ready position slightly spaced from the wall of the cup, and which also drives the brake ring and jams between the lobes of the brake ring when the brake ring engages the cup so as to increase the force of the connection.

It is another object of the invention to provide an easily manufactured and assembled design, in which the brake ring is molded as one piece and the brake ring and drive ring may be easily installed into the cup with the drive ring retaining the brake ring in place.

DESCRIPTION OF THE PREFERRED EMBODIMENT

These and other objects and features of the invention will appear from the following written description, and from the drawings, in which.

Figures 1, 2, 3, 4:
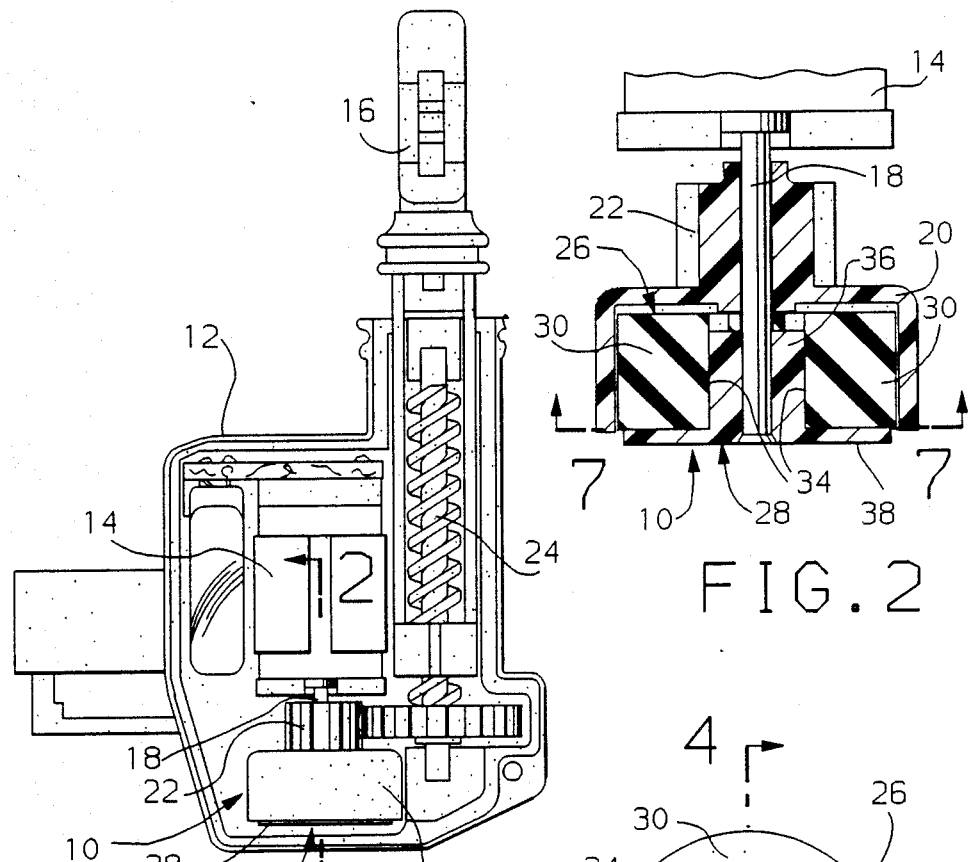
FIG. 1 is a sectional view showing a motor, drive shaft, lock lift arm and a preferred embodiment of the clutch of the invention.
FIG. 2 is a view taken along the line 2—2 of FIG. 1.
FIG. 3 is a plan view of the brake ring of the clutch.
FIG. 4 is a sectional view of the brake ring taken along the line 4—4 of FIG. 3.
Figure 5:
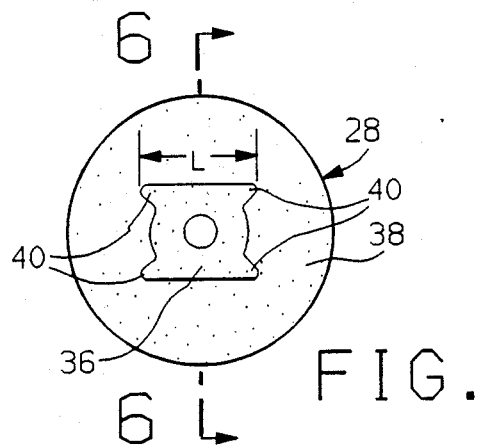
FIG. 5 is a plan view of the drive ring of the clutch.
Figure 6:
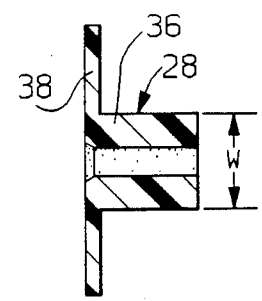
FIG. 6 is a sectional view of the drive ring taken along the line 6—6 of FIG. 5.

Referring first to FIG. 1, a power door lock actuator assembly incorporates a preferred embodiment of the clutch of the invention, designated generally at 10. A housing 12 contains several parts, including a motor 14 and lock lift arm 16. Motor 14 is bi-directional, and would be operated by conventional switching and circuitry, not illustrated. Motor 14 has a central drive shaft 18 to which a cupped output member 20, molded of nylon, is coaxially and freely pivoted. Cup 20 is drivingly engaged by teeth 22 to a jack screw 24 that drives lock lift arm 16 up and down. So, cup 20 has to be turned in order to shift lock arm 16, but since cup 20 is freely pivoted to shaft 18, shaft 18 cannot act directly. Clutch 10 provides the selective connection between cup 20 and lift arm 16.

Referring next to FIGS. 3-6, clutch 10 includes two basic parts, a brake ring designated generally at 26 and a drive ring designated generally at 28. Brake ring 26 is molded of elastomer or other resilient material in one piece with a pair of diametrically opposed, massive lobes 30 joined by a pair of integral, generally U shaped spring members 32. The outer surfaces of the lobes 30 are arcuate in shape and, being molded of elastomer, are sufficiently tacky to make a frictional contact with the wall of the cup 20. The inner surfaces 34 of the lobes 30 are parallel to one another, and spaced apart a distance S in the free molded state shown. Lobes 30, therefore, form a generally rectangular relieved portion centrally in brake ring 26. Drive ring 28 is nylon or other rigid material with a camming member 36 that sits coaxially atop a round retention flange 38. Flange 38 has a diameter less than brake ring 26, but greater than the distance S. Camming member 36 is generally rectangular in shape, with a width W less than its length L. Instead of having sharp, square corners, however, camming member 36 has four rounded corners or ears 40. Width W is just slightly greater than the distance S, for a reason described below.

Figure 7:
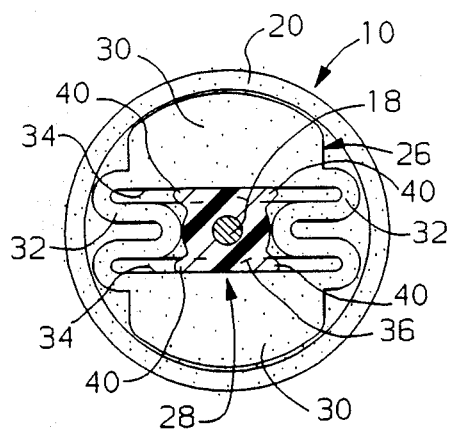
FIG. 7 is a view taken along the line 7—7 of FIG. 2 showing the clutch stationary, with the brake ring in its ready position, disengaged from the wall of the cup.

Referring next in FIGS. 2 and 7, the two basic components of the clutch 10 may be easily assembled. First, the drive ring camming member 36 is pushed between the brake ring inner surfaces 34. Because of the relation of W and S described above, there is a snug fit between the two components that creates a separate unit or subassembly. Camming member 36 acts like a stretcher or frame, maintaining the brake ring lobes 30 pushed out slightly from their free molded state, keeping ther spring members 32 under some tension. The width of camming member 36 is such that it maintains the brake ring 26 with the outer surfaces of the lobes 30 at a diameter just less than the diameter of the inner wall of cup 20. Then, the two components are slipped coaxially inside of cup 20, with the end of motor drive shaft 18 being staked or otherwise secured to drive ring 28. While brake ring 26 is not directly attached to shaft 18, it is trapped thereon between the bottom of cup 20 and the drive ring flange 38. As best seen in FIG. 7, when stationary, the camming member 36 maintains the lobes 30 accurately and closely spaced from the wall of cup 20. So, the drive ring 28 acts as both a retention member and a locater for the brake ring 26.

Figure 8:
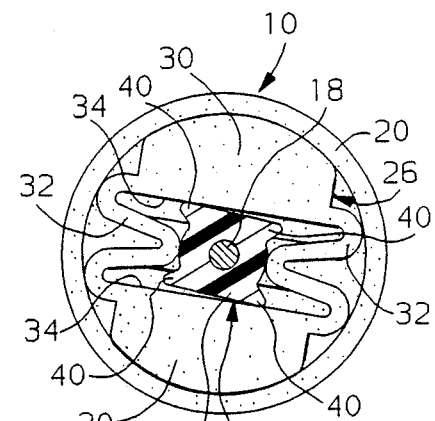
FIG. 8 is a view like FIG. 7, but showing the clutch starting to turn, and just engaged with the cup.
Figure 9:
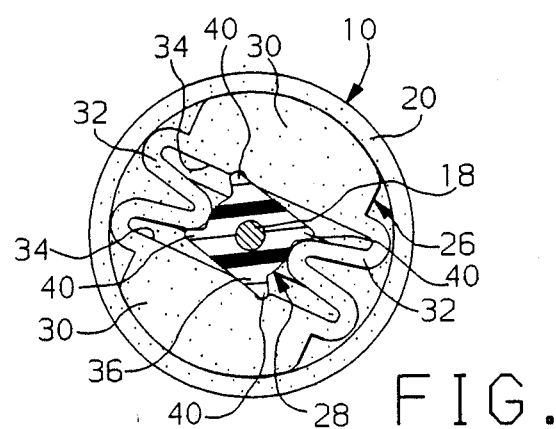
FIG. 9 is a view showing the clutch turned farther, and more strongly engaged with the cup.

Referring next to FIGS. 7 through 9, when stationary, as in FIG. 7, the camming member 36 is located generally parallel to the lobe inner surfaces 34, at what may be termed a non operative angular position relative to the brake ring 26. That is, only the width of the camming member 36 acts to push the lobes 30 apart. With the motor 14 off, the brake ring 26 is maintained at what may be termed an equilibrium, ready position within cup 20, with the spring members 32 pulling the lobes snugly up against the short sides of the camming member 36. Manual movement of the lock lift arm 16 will not back drive the motor, and will run only the jack screw 24, which has a low resistance. When motor 14 is switched on and shaft 18 begins to turn, so long as drive ring 28 turns slowly enough that the centrifugal outward forced on the lobes 30 does not exceed the resilient inward force of the spring members 32, the brake ring 26 will turn one to one with the drive ring 28, and the two will stay at the non operative angular relation of FIG. 7. The lobes 30 will not engage the inside of the cup 20. Very soon, however, the lobes 30 will be thrown out far enough to hit the inside of cup 20, as seen in FIG. 8. This may occur quite quickly, probably within 15 to twenty degrees of turning from rest. Because of the tacky surface, lobes 30 begin to turn cup 20, and begin to see the load of lock lift arm 16. Consequently, brake ring 26 is slowed relative to drive ring 28, and the camming member 36 can begin to tilt beyond its non operative angular relation. Then, the length of camming member 36 begins to act on the brake ring 26. The camming member length L is sufficient that it will not turn to slip between the lobe inner surfaces 34. Specifically, as camming member 36 tilts, two diagonally opposed ears 40 begin to jam into the lobe inner surfaces 34, pushing them farther out and increasing the force of the connection between brake ring 26 and cup 20. As seen in FIG. 9, if cup 20 sees more load, camming member 36 can tilt farther, jamming more strongly. So, beyond its retention and locating function, drive ring 28 also serves to control and increase the strength of the clutch connection, when needed. When the motor drive shaft 18 stops, the lobes 30 are pulled back in by the spring members 32 to the equilibrium, ready position of FIG. 7.

Variations of the preferred embodiment disclosed may be made. A different shape for the relieved portion in the center of brake ring could be used, so long as the brake ring had sufficient peripheral mass to expand when spun about its center due to centrifugal force. The drive ring would then have a consequently different, but generally matching, shape. So long as the camming member fit closely within the brake ring when they were in a non operative angular relation, and so maintained the brake ring in its ready position, but jammed itself within the brake ring relieved portion when turned beyond the non operative angular relation, the same basic operation could be achieved. The rectangular camming member 36 and the straight, parallel inner surfaces 34 of the two lobed brake ring 26 lend themselves particularly well to the two component design, with the unitary molded brake ring and the separate subassembly, however. The retention flange 38 on the drive ring 28 is not absolutely necessary to the basic operation, but cooperates in creating a simple, easily assembled unit by helping retain the brake ring 26 to the end of the motor shaft 18. The ears 40 on the camming member 46 are not necessary to the basic jamming action, but are useful in that their outermost surface areas, lying at the points of an X, define the the length and width dimensions of the camming member 36, and they jam into the brake ring inner surfaces 34 without damage. Therefore, it will be understood that the invention is not intended to be limited to just the preferred embodiment disclosed.

The embodiments of the invention in which an exclusive property or privilege is claimed are defined as follows:

1. In a vehicle power door lock actuator assembly of the type that has a lock lift arm, a rotatable drive shaft, and a cupped output member that is freely pivoted coaxially to said drive shaft and drivingly engaged with said lock lift arm, an improved centrifugal clutch for selectively coupling said output member to said drive shaft, said improved clutch comprising, a unitary brake ring molded of resilient material including a pair of diametrically opposed massive lobes having arcuate outer surfaces and generally parallel inner surfaces joined by a pair of integral spring members and spaced apart by a predetermined distance when in a free state, and, a drive ring adapted to be joined coaxially to said drive shaft including a generally rectangular camming member with a width that is just slightly greater than said predetermined spacing of said brake ring lobe inner surfaces and sufficient to maintain said brake ring lobe outer surfaces at a diameter slightly less than the diameter of said cupped output member, said drive ring also having a lowermost retention flange coaxial to said camming member with a diameter less than said brake ring but greater than said predetermined spacing, whereby, said drive ring camming member may be inserted between said brake ring lobe inner surfaces, thereby forcing them apart slightly from said free state to create a separate subassembly of said drive ring and brake ring which can be joined as a unit to said drive shaft by slipping said subassembly inside said cupped output member and then joining said drive ring to said drive shaft, after which said brake ring is trapped between said drive ring retention flange and said cupped output member.

* * * * *